(12) United States Patent
Bósze et al.

(10) Patent No.: US 11,823,848 B2
(45) Date of Patent: Nov. 21, 2023

(54) ELECTROLYTIC CAPACITOR WITH CONTROLLING ELEMENT FOR GAS DIFFUSION

(71) Applicant: TDK Electronics AG, Munich (DE)

(72) Inventors: Róbert Bósze, Tanakajd (HU); Gábor Székely, Zalaszentgrót (HU); Tamás Lakatár, Kőszeg (HU); András Dugmonits, Szombathely (HU); Ottó Klug, Szombathely (HU)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 17/641,081

(22) PCT Filed: Nov. 30, 2020

(86) PCT No.: PCT/EP2020/083910
§ 371 (c)(1),
(2) Date: Mar. 7, 2022

(87) PCT Pub. No.: WO2021/115821
PCT Pub. Date: Jun. 17, 2021

(65) Prior Publication Data
US 2022/0344104 A1  Oct. 27, 2022

(30) Foreign Application Priority Data

Dec. 9, 2019  (DE) .......................... 102019133565.5

(51) Int. Cl.
*H01G 9/12* (2006.01)
*H01G 9/10* (2006.01)
*H01G 9/00* (2006.01)

(52) U.S. Cl.
CPC ................. *H01G 9/12* (2013.01); *H01G 9/10* (2013.01); *H01G 9/0029* (2013.01)

(58) Field of Classification Search
None
See application file for complete search history.

(56) References Cited

U.S. PATENT DOCUMENTS 2,766,408 A * 10/1956 Georgiev ............ H01M 50/342
  220/203.13
3,463,969 A *  8/1969 Wershey ................. H01G 9/12
  29/25.03

(Continued)

FOREIGN PATENT DOCUMENTS

DE  102005033476 A1  1/2007
DE  102015119844 A1  5/2017

(Continued)

OTHER PUBLICATIONS

International Search Report and Written Opinion of International Searching Authority corresponding to International Patent Application No. PCT/EP2020/083910, dated May 3, 2021 (14 pages).

(Continued)

*Primary Examiner* — Dion R. Ferguson
(74) *Attorney, Agent, or Firm* — Nixon Peabody LLP (57) ABSTRACT

An electrolytic capacitor comprises a case, a capacitor element mounted in the case and an element for controlling gas diffusion between inside and outside the case. The controlling element is embedded in the case.

20 Claims, 3 Drawing Sheets

(56) References Cited

U.S. PATENT DOCUMENTS

| | | | | |
|---|---|---|---|---|
| 3,669,302 | A | * | 6/1972 | Markarian ............... H01G 9/12 |
| | | | | 220/DIG. 27 |
| 3,688,162 | A | * | 8/1972 | Willy ...................... H01G 9/12 |
| | | | | 361/521 |
| 3,935,030 | A | * | 1/1976 | Sperandio ........... H01M 50/367 |
| | | | | 220/203.11 |
| 4,004,199 | A | * | 1/1977 | Pearce ..................... H01G 9/10 |
| | | | | 174/522 |
| 4,245,277 | A | * | 1/1981 | van Gils ................. H01G 9/12 |
| | | | | 29/25.03 |
| 5,579,203 | A | * | 11/1996 | Klaschka ................ H01G 9/10 |
| | | | | 361/519 |
| 9,437,368 | B2 | * | 9/2016 | Mori ........................ H01G 9/12 |
| 9,875,856 | B2 | * | 1/2018 | Kuroki ................... H01G 11/18 |
| 11,031,580 | B2 | * | 6/2021 | Lee ................... H01M 10/0525 |
| 11,393,639 | B2 | * | 7/2022 | Honda ..................... H01G 9/12 |
| 11,501,925 | B2 | * | 11/2022 | Elekes ..................... H01G 9/12 |
| 2005/0287422 | A1 | | 12/2005 | Kim et al. |
| 2012/0328913 | A1 | * | 12/2012 | Chuang ............... H01M 50/147 |
| | | | | 429/54 |
| 2014/0233156 | A1 | * | 8/2014 | Yasuzaka ................ H01G 9/12 |
| | | | | 361/521 |
| 2014/0240900 | A1 | * | 8/2014 | Mori ........................ H01G 9/08 |
| | | | | 361/521 |
| 2017/0271092 | A1 | | 9/2017 | Ishii |
| 2018/0330887 | A1 | * | 11/2018 | Elekes ..................... H01G 9/12 |
| 2021/0343481 | A1 | * | 11/2021 | Elekes ................... H01G 9/035 |
| 2022/0020535 | A1 | * | 1/2022 | Li ............................ H01G 9/12 |
| 2022/0344104 | A1 | * | 10/2022 | Bósze ...................... H01G 9/12 |

FOREIGN PATENT DOCUMENTS

| | | | | |
|---|---|---|---|---|
| EP | 3115100 | A1 | | 1/2017 |
| EP | 3116050 | A1 * | 1/2017 | ........... A61K 31/519 |
| EP | 2202117 | B1 | | 12/2018 |
| FR | 930703 | A | | 2/1948 |
| JP | S 52-87658 | A | | 7/1977 |
| JP | S35-026063 | Y | | 7/1988 |
| JP | 2000-058399 | A | | 2/2000 |
| JP | 2001-052672 | A | | 2/2001 |
| JP | 2003-217546 | A | | 7/2003 |
| JP | 2004-281061 | A | | 10/2004 |
| JP | 2006-012831 | A | | 1/2006 |
| JP | 2011-187773 | A | | 9/2011 |
| JP | 2011-204724 | A | | 10/2011 |
| JP | 2015-181153 | A | | 10/2015 |
| JP | 2018-538687 | A | | 12/2018 |
| KR | 20140051496 | A * | 5/2014 | |

OTHER PUBLICATIONS

Examination Report in corresponding Japanese Patent Application No. 2022-514276, dated Apr. 25, 2023, in Japanese (6 pages).

Examination Report in corresponding Japanese Patent Application No. 2022-514276, dated Sep. 11, 2023, in Japanese (8 pages).

Machine translation of Examination Report in corresponding Japanese Patent Application No. 2022-514276, dated Sep. 11, 2023 (10 pages).

* cited by examiner

ELECTROLYTIC CAPACITOR WITH CONTROLLING ELEMENT FOR GAS DIFFUSION

RELATED APPLICATIONS

This application is a U.S. National Stage of International Application No. PCT/EP2020/083910 filed on Nov. 30, 2020, which claims the benefit of German Patent Application No. 102019133565.5, filed on Dec. 9, 2019, each of which is hereby incorporated by reference in its entirety.

FIELD OF THE INVENTION

The present invention relates to an electrolytic capacitor which comprises a case and a capacitor element mounted in the case. The capacitor element comprises an electrolyte.

BACKGROUND OF THE INVENTION

The U.S. Pat. No. 3,463,969 discloses an electrolytic capacitor with a molded cover member and a vent inside the cover member.

The U.S. Pat. Nos. 2,766,408 and 3,669,302 disclose a vent plug for an electrolytic capacitor. The vent plug is located in the injection molded cover member.

The patent application DE 102015119844 A1 discloses an electrolytic capacitor with a safety vent inside the case.

During the long term operation of an electrolytic capacitor essential electrochemical reactions as well as aging induced chemical decomposition occurs. Both procedures result in gas evolution inside the capacitor. Gas generation gradually increases the internal pressure in the capacitor and creates mechanical stress on the capacitor case and the cover member. The internal pressure may cause deformation such as elongation or bulging, and finally the rupture of the case, both leading to the end of life of the capacitor.

It is an object of the present invention to provide an electrolytic capacitor with an improved stability of operation.

The problem is solved by the present invention as disclosed in claim 1.

SUMMARY OF THE INVENTION

In one embodiment, the present invention relates to an electrolytic capacitor, comprising a case, a capacitor element mounted in the case and an element for controlling gas diffusion between inside and outside the case, wherein the controlling element is embedded in the case.

Since gas generation increases the internal pressure in the capacitor and creates mechanical stress on the case, an element for controlling the gas exchange between inside and outside the capacitor is indispensable.

The controlling element provides a passageway for gas from the inside to the outside of the case. The controlling element further is configured to control movement of gas to provide diffusion.

The case may have the shape of a can. The capacitor element can be a round element, in particular a cylindrically shaped element. The capacitor element may comprise foils, in particular aluminum foils. The capacitor element may be impregnated by an electrolyte, in particular a liquid electrolyte.

In one embodiment, the capacitor comprises a cavity, wherein the controlling element is arranged such that the gas from the cavity can flow directly to the controlling element. The cavity is the largest hollow space inside the capacitor. Thus, a large part of the gas present in the capacitor is stored in said cavity. The cavity may extend along a central axis of the capacitor element. The cavity may result from winding the foils of the capacitor element around a central axis. The cavity is the largest hollow space inside the capacitor. Thus, a large part of the gas present in the capacitor is stored in said cavity.

The controlling element may be arranged directly adjacent to the cavity. In case that the cavity is the axial-centred cavity of a winding element, the controlling element may be at an axial-centred position. Positioning the controlling element directly adjacent to the cavity has the advantage that the outer surface of the capacitor element, in particular the winding element, does not obstruct the path of diffusion by the turns of the winding.

In an embodiment, the case of the electrolytic capacitor comprises a can and a cover member for sealing the can, wherein the controlling element is arranged in the can. Preferably, the controlling element is integrated into the bottom of the case. The bottom is the side of the case opposite to the cover member. The cover member may comprise an elastic material, in particular a rubber material. The cover member may be an element plugged in the can. Terminals for electrical interconnection may lead through the cover member. The cover member is free of any controlling element. In an embodiment, the electrolytic capacitor comprises two or more vertically stacked cover members for sealing the can.

The controlling element may be embedded in a part of the case opposite to the location of the electrical terminals. In an embodiment, the terminals lead through the cover member on top of the case, whereas the controlling element is arranged in the bottom of the case. Hence, the position and the lateral dimension of the controlling element can be varied in a wide range without interfering with terminal positions or the cover member's mechanical stability. Since the can is preferably made of aluminum, the can's mechanical stability is higher than the mechanical stability of the cover member. The terminals for electrically interconnecting the capacitor may be configured in a snap-in style.

In an embodiment, the controlling element is fully integrated in the case. The controlling element, embedded in the case, does protrude neither over the inside nor over the outside of the case. No protrusion is caused by the controlling element in the inside of the case since the controlling element requires only little vertical space. Therefore, more space is available for the capacitor element, for example the winding element.

In an embodiment, the bottom can be flat from the outside. In another embodiment, the bottom can comprise a protrusion which accommodates the controlling element. In both cases the controlling element is fully integrated in the case. The controlling element does not protrude beyond the case.

A distance may be kept between the controlling element and the capacitor element. Distance providing means could be embodied e.g. in form of ribs. Ribs provided on the inner case side keep a certain distance between the capacitor element and the controlling element. The ribs create a hollow space to promote a free gas flow from the inside of the capacitor to the controlling element.

The controlling element may comprise a membrane. The membrane's dimensions, the membrane thickness and the exact material composition of the membrane may influence permeability of the membrane and the speed of gas diffusion through the membrane. These parameters can be adapted to practical technical requirements.

In particular, the membrane may be gradually gas-permeable. As the pressure in the capacitor increases, the gas diffusion increases as well. On the other hand, the membrane should preferably not be permeable to liquids. If the membrane is liquid-permeable, there is a risk of liquid electrolyte loss.

The membrane may consist of a material which is one of silicon, ethylene propylene diene monomer rubber (EPDM) or another elastic polymer with comparable properties.

The membrane material may be selected according to the required membrane properties. The required permeability of the membrane should be selected according to several criteria. On the one hand, the membrane should be sufficiently permeable against gases which are intended to pass through the membrane. In particular, the membrane may be permeable against hydrogen. On the other hand, the permeability should be sufficiently low against gases and vapor which are not intended to pass through the membrane. In particular, the membrane may not be permeable against vapor of the electrolyte solvent. The membrane may not be permeable against liquids in general.

Using a membrane as the controlling element has several advantages. A membrane requires little vertical space and volume. Hence, less inner volume of the capacitor is consumed for the controlling element and more inner volume is available for the capacitor element.

Furthermore, by using a membrane unnecessary dead spaces are avoided.

Additionally, a membrane made of a material mentioned above has a low thickness. Therefore a controlling element which is a membrane is thinner than the wall of the case usually made of alumina. Hence, the membrane can easily be integrated in the case. The controlling element, which is a membrane, does not protrude beyond the case. No inner volume is wasted by the controlling element. More inner volume is available for the capacitor element.

Furthermore, a membrane made of an elastic material like the materials mentioned above can be strongly tightened, thus enabling a tight sealing.

The capacitor element may be impregnated by an electrolyte, in particular a liquid electrolyte. The liquid electrolyte, or any other liquid in the inside of the capacitor may flow to the membrane. If a liquid flows into the membrane pores, the membrane pores will block up and the permeability of the membrane decreases.

In an embodiment, the capacitor is mounted such that the side of the case comprising the membrane does not point downwards. As an example, the side comprising the membrane points upwards or is oriented horizontally. In this case, the liquid electrolyte can be efficiently prevented from flowing to the membrane. In addition, a contamination of the membrane by the liquid electrolyte may be prevented. This may ensure that gas diffusion is maintained.

In an embodiment the capacitor is mounted such that the side with the controlling element points upwards. Therefore the bottom of the can points upwards. The terminals may be positioned at the opposite side. Hence, the terminals may point downwards. In a further embodiment, the capacitor is mounted with the membrane vent and the terminals are arranged at horizontal sides.

In an embodiment, the membrane acts as an irreversible safety vent when a maximum permissible pressure within the capacitor is exceeded.

During operation, the pressure inside the capacitor may increase, particularly in the case of an electrical overload. The safety vent may be configured to burst when the pressure approaches a critical value exceeding a maximum permissible pressure. Thereby, an uncontrolled explosion of the capacitor may be prevented. If a critical pressure is reached, the membrane will burst and the gas inside of the capacitor will flow outwards until the pressure is reduced to an extent where breakage of the housing is prevented.

After a burst of the membrane there is the risk of contamination of the terminals and/or other components such as a printed circuit board or a bus bar due to liquid electrolyte leaking out of the case. By positioning the membrane at a side remote from the side of the terminals, the risk of contamination can be reduced and the operational life of the electronic components can be prolonged. Therefore, in an embodiment, the controlling element acting as an irreversible safety vent is positioned at the opposite side of the terminals.

In an embodiment, the capacitor is mounted such that the side with the irreversible safety vent does not point downwards. In a preferred embodiment, the side points upwards.

In an embodiment the maximum permissible pressure is determined by the tightness of the membrane. If this maximum permissible pressure is exceeded, the membrane acts as an irreversible safety vent by bursting. If the membrane is more strongly tightened by a mounting element, the permeability of the membrane decreases. In this case, a comparable lower pressure causes the membrane to burst. If the membrane is less strongly tightened by a mounting element, the permeability of the membrane increases. In this case, a comparable higher pressure is required to burst the membrane. Hence, the maximum permissible pressure can be set by tightening the membrane by a mounting element.

In one embodiment the membrane has the shape of a disk. A disk shape is a preferred and stable structure of a membrane used for gas diffusion.

In an embodiment the electrolytic capacitor comprises a mounting ring for fixing the membrane, wherein the mounting ring has an appropriate shape for accommodating the membrane. The mounting ring as well as the case may consist of aluminum. The aluminum of the mounting ring and the case may be of the same grade. In an embodiment, the mounting ring may comprise metals other than aluminum. In particular, the mounting ring may consist of a material, which does not harm or disturb the operation of the capacitor. The mounting ring is produced by punching or impact extrusion.

Furthermore, the mounting ring may comprise a sealing gate on its surface increasing the membrane's tightness and sealing. In an embodiment, the sealing gate may also be on the mounting ring's counterpart. The sealing gate may comprise the same material as the mounting ring. Thus, the sealing gate may consist of aluminum or another metal. In an embodiment, the sealing gate may comprise a material different from the material of the mounting ring. In particular, the sealing gate may consist of a material, which does not harm or disturb the operation of the capacitor.

The sealing gate may be a bump on the surface of the mounting ring. The sealing gate tightens the membrane by deforming it. In an embodiment, the mounting ring may comprise several sealing gates.

The deformation as a function of the sealing gate is performed by compressing the membrane along a closed curve. The membrane should be compressed to such an extent that mechanical fixation is achieved. Furthermore, the membrane should be compressed to such an extent that tightness against liquids in the range of the possible operating pressures of the capacitor is achieved. On the other hand, damage to the membrane material should be avoided when compressing the membrane.

In order to tighten the membrane, the mounting ring may have a larger diameter than the membrane. A large mounting ring with appropriate sealing gates may allow to deform and tighten the membrane strongly. Therefore, the membrane bursts at a relatively low critical pressure exceeding a relatively low maximum permissible pressure. A comparably smaller mounting ring with a high number of sealing gates may have the same effect. The number of sealing gates may be the same or bigger than the number of sealing gates of the comparably larger mounting ring.

A smaller mounting ring with less sealing gates may deform and tighten the membrane less strongly. Therefore the membrane bursts at a higher critical pressure exceeding a higher maximum permissible pressure.

Additionally, a mounting ring with a high diameter may allow to deform the membrane easily. Therefore may apply: The higher the diameter of the mounting ring, the easier the membrane can be deformed at a given pressure. Besides higher deformation, the membrane bursts at a lower pressure. This way, varying the mounting ring diameter may allow to select and fine-tune the maximum permissible pressure.

The case of the electrolytic capacitor may comprise a recess to accommodate the membrane and the mounting ring.

In one embodiment, the recess to accommodate the membrane is arranged on the inside of the case. Thus, the membrane and the mounting ring have to be arranged from the inside. In another embodiment, the recess to accommodate the membrane is arranged on the outside of the case. Thus, the membrane and the mounting ring have to be arranged from the outside.

The membrane and the mounting ring embedded in the recess do not protrude beyond the case either on the inside or the outside. Because of the flat shape of the membrane and the mounting ring, the recess requires only little volume and low vertical space. Therefore, the case does not consume any extra volume of the inside of the capacitor compared to a capacitor without controlling element. The inner volume is available for the capacitor element, for example for the winding element. In one embodiment, the bottom of the case may be flat. In another embodiment, the bottom comprises a protrusion accommodating the recess in which the membrane and the mounting ring are arranged.

Furthermore, the recess to accommodate the membrane may comprise a sealing gate on its inner surface increasing the membrane tightness and sealing. In such a case the mounting ring may lack any sealing gate.

In an embodiment, both the inner surface of the recess and the mounting ring may comprise sealing gates. The inner surface of the recess may be the mounting ring's counterpart. The sealing gates may be created as bumps. A larger size or higher number of the sealing gates may increase the deformation and thus the tightness and sealing of the membrane. By a high tightness of the membrane, the maximum permissible pressure is lowered.

The present invention further comprises a method of fixing a membrane on a capacitor element. The method comprises several steps. An electrolytic capacitor is provided comprising a case with a recess for the membrane and a capacitor element mounted in the case. The membrane is embedded in the recess. In one method, the membrane may be embedded from the outside, if the recess is on the outside of the case. In another method, the membrane may be embedded on the inside of the capacitor, if the recess is on the inside of the case.

When the membrane is arranged in the recess, a mounting ring consisting of metal is embedded into the recess onto the membrane. The mounting ring is suitably formed to accommodate the membrane. During the assembly process, pressure is applied to the mounting ring, which is imparted on the membrane. As a result, the membrane may be deformed to make the system tight. In order to receive a tight sealing the membrane consist preferably of an elastic material like rubber or another elastomer.

Sealing gates on the inner surface of the recess or the surface of the mounting ring support the deforming and sealing process. After the membrane and the mounting ring are arranged in the recess, the mounting ring is fixed by an external process like cutting-in, forging or any kind of welding. In one method, the method of welding may be laser welding. In another method, the mounting ring is fixed by riveting. Riveting can be completed on the whole ring or on parts of the ring. By fixing the mounting ring the membrane is fixed as well.

BRIEF DESCRIPTION OF THE DRAWINGS

The present disclosure comprises several embodiments and aspects of the invention. Every feature described with respect to one of the embodiments or the method is also disclosed herein with respect to the respective other embodiments and aspects, even if the respective feature is not explicitly mentioned in the context of the specific embodiment or aspect.

Further features, refinements and expediencies become apparent from the following description of the exemplary embodiments in connection with the figure.

Similar elements, elements of the same kind and identically acting elements may be provided with the same reference numerals in the figures.

BRIEF DESCRIPTION OF THE DRAWINGS

Figure 1:
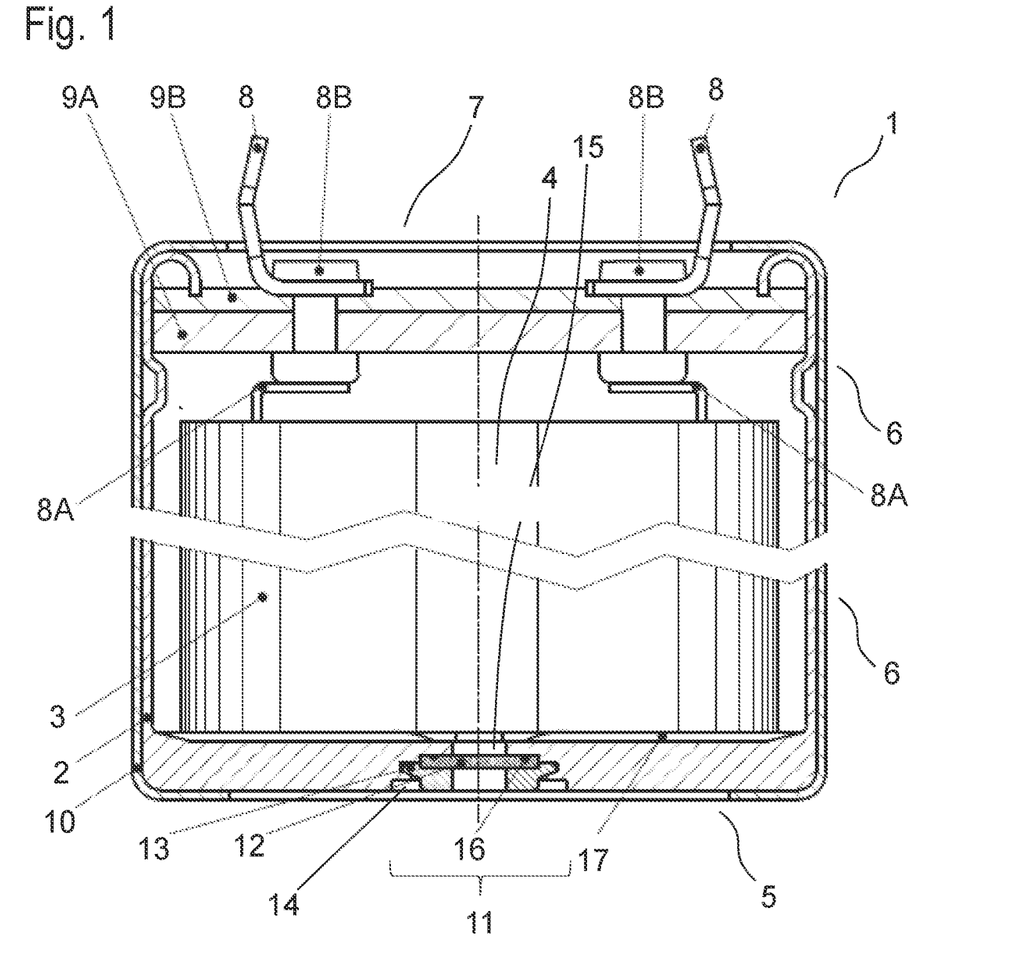
FIG. 1 shows a schematic cross-sectional view of a capacitor according to a first embodiment.

FIG. 1 shows an electrolytic capacitor 1. The capacitor comprises a case 2 and a capacitor element 3 mounted in the case 2. The capacitor element 3 comprises a winding element. The capacitor element 3 has a cylindrical shape with an axial-centred cavity 4. The cavity extends along the winding element's central axis. The capacitor element 3 comprises foils, in particular aluminum foils. The capacitor element 3, in particular the aluminum foils, is/are impregnated with an electrolyte. The electrolyte is a liquid electrolyte.

The case 2 has the shape of a circular cylinder. The case 2 comprises a metal. As an example, the case 2 comprises aluminum. The case 2 has the shape of a can.

The capacitor 1 comprises a bottom 5, a curved lateral side 6 and an upper side 7. The upper side 7 is opposite the bottom 5. A maximum length of the capacitor 1 from the outer edge of the bottom 5 to the outer edge of the upper side 7 amounts more than 35 mm. The maximum length amounts less than or equal to 120 mm. The diameter of the case 2 is in a range from 22 mm or more to 50 mm or less. The bottom 5 is integrally formed with the lateral side 6. Together they form the can. The can comprises a metal, in particular aluminum.

At the upper side 7, the capacitor 1 comprises terminals 8 for electrically interconnecting the capacitor. One of the terminals 8 is the positive terminal. The other one of the terminals 8 is the negative terminal. The terminals 8 are configured as snap-in terminals. The terminals 8 are connected with the capacitor element 3 by additional connecting elements. The connecting elements comprise a terminal tab 8A and a terminal rivet 8B. The capacitor 1 is configured to be mounted terminal-down, such that the terminals 8 point towards the earth's center. Alternatively, the capacitor 1 is mounted horizontally, for example, if the terminals 8 point in a horizontal direction.

The capacitor 1 may be mounted at a mounting member (not shown). The mounting member serves to fix the capacitor 1. Additionally, the mounting member may serve to electrically connect the terminals 8. In this case, the mounting member may comprise a printed circuit board or a bus bar, for example.

At the upper side 7, the case 2 is sealed by a cover comprising two cover members 9A and 9B. The cover members 9A and 9B have the shape of a disk. The cover member 9A comprises a paper laminate. The cover member 9B comprises an elastomer. In an embodiment, the cover member may comprise a rubber material. The terminals 8 are lead through the cover members 9A and 9B. In another embodiment, the cover may comprise only one cover member.

On the outside of the case 2 on the lateral side 6 a shrinking sleeve 10 is arranged. The shrinking sleeve additionally protects the case 2. The shrinking sleeve comprises a heat-shrinkable polymer. Heat-shrinkable means that the polymer shrinks in length, if heated up.

The capacitor 1 comprises a controlling element 11. The controlling element 11 provides a passageway for gas connecting the inside and the outside of the case 2. The passageway comprises a hole 15 between the inside and the outside of the case 2. The controlling element 11 further comprises a recess 14 narrowing to the hole 15.

In the recess 14 a membrane 12 and a mounting ring 13 are arranged. The membrane 12 and the mounting ring 13 are fully integrated in the case 2. They do not protrude beyond the surface of the case 2. The whole controlling element 11 is arranged such that gas from the axial-centred cavity 4 in the capacitor element 3 can flow directly to the controlling element 11.

The controlling element 11 enables controlled pressure relief. During operation of the capacitor 1, gas generation and pressurization inside the capacitor 1 may occur. These effects are caused by electrochemical reactions. The membrane 12 as a part of the controlling element 11 enables diffusion of the gas to the ambient during the operation of the electrolytic capacitor 1. Thereby the inner pressure is reduced. Thus, the inner pressure can be adapted to ambient pressure.

The membrane 12 comprises a silicon material. The membrane 12 may further comprise EPDM or another elastic plastic material. The membrane 12 may also comprise a rubber material. In particular, the membrane 12 is a thin silicon membrane. The thickness of the membrane 12 is thin compared to the wall thickness of the case 2. Thus, a membrane requires less vertical space and volume than other types of vents. Therefore more inner volume is available for the capacitor element 3. The membrane 12 may be permeable or semi-permeable for gas. The membrane 12 is circular shaped. The diameter of the membrane 12 is around 3 mm.

Onto the membrane 12 the mounting ring 13 is arranged in the recess 14. Both the membrane 12 and the mounting ring 13 are arranged from the outside, since the recess 14 is positioned at the outside of the case 2.

The mounting ring 13 comprises a metal. In particular, the mounting ring 13 comprises aluminum. The mounting ring 13 may be a punched part or impact-extruded. The mounting ring 13 has an appropriate shape to accommodate the membrane 12. The mounting ring 13 may comprise sealing gates 16 on its surface. The sealing gates 16 may be created as bumps. The sealing gates 16 increase the deformation, and therefore the tightness, of the membrane 12.

The diameter of the mounting ring 13 is larger than the diameter of the membrane 12. The diameter of the mounting ring 13 is in a range between 3 mm and 6 mm. Preferably, the diameter of the mounting ring 13 is in a range between 3 mm and 4 mm. A larger diameter of the mounting ring 13 leads to increasing deformation and tightness of the membrane 12. Additional sealing gates 16 also lead to increasing deformation and tightness of the membrane 12.

The mounting ring 13 is fixed by an external process such as riveting, cutting-in, forging or any kind of welding process. By fixing the mounting ring 13 the membrane 12 is fixed as well. Therefore the mounting ring 13 has two main functions: Tightening of the membrane 12 and fixing of the membrane 12.

A distance 17 is kept between the bottom of the case 5 comprising the controlling element 11 and the capacitor element 3. The distance is kept by inner ribs ensuring a certain space between the capacitor element 3 and the membrane 12 to get a free gas flow to the membrane 12. The distance 17 amounts about 0.5 mm. In an embodiment, the distance 17 amounts exactly 0.5 mm.

Furthermore, the inner surface of the recess 14 comprises sealing gates 16 to deform and tighten the membrane 12. The sealing gates 16 are created as bumps. A higher number of sealing gates 16 leads to increasing deformation and tightness of the membrane 12.

Additionally, the membrane 12 acts as an irreversible safety vent in the event of an impermissible overpressure within the capacitor. If a critical pressure exceeding the maximum permissible pressure is reached, the membrane 12 bursts.

The maximum permissible pressure is determined by the tightness of the membrane. The tighter the membrane the more the maximum permissible pressure decreases. The looser the membrane, the more the maximum permissible pressure increases.

A mounting orientation of the capacitor 1 is beneficial where the bottom 5 of the case 2 of the capacitor 1 points upwards. This orientation corresponds to a terminal-down mounting orientation. This construction prevents the membrane 12 from being covered with liquid electrolyte.

When the membrane 12 is located at a lower side of the capacitor 1, liquid electrolyte may cover the membrane 12 due to gravity and thus block diffusion of the gas. This may result in cumulative pressurization until the membrane 12 bursts. This phenomenon reduces the efficiency of the operation of the membrane 12. When the membrane 12 is positioned at an upper side of the capacitor 1 it is kept from liquid electrolyte such that gradual diffusion is maintained.

When the membrane 12 bursts a bottom-up orientation helps to avoid liquid electrolyte leakage to the outside of the capacitor 1. This further prevents ambient devices from being contaminated by the liquid electrolyte.

Figure 2A:
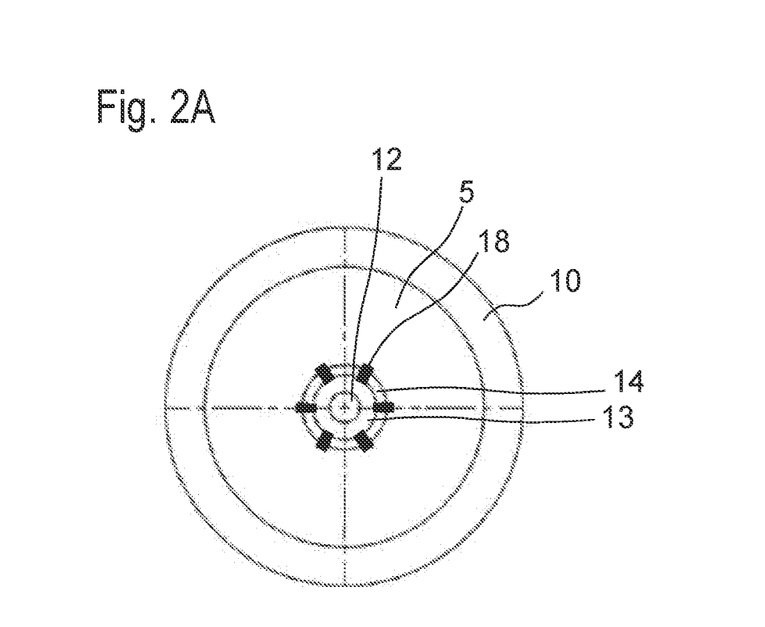
FIG. 2A shows a bottom view of the capacitor according to the first embodiment.

FIG. 2A shows a view on the bottom 5 of the capacitor 1 according to FIG. 1. The bottom 5 is a part of the case 2 of the capacitor 1 and is made from aluminum. In an axial-centred position the recess 14 is recessed at the outside of the case 2. The membrane 12 and a mounting ring 13 are arranged inside the recess 14. The membrane 12 covers the hole 15 according to FIG. 1. A shrinking sleeve 10 surrounds the capacitor 1 for protection.

The mounting ring 13 is shaped to accommodate and tighten the membrane 12. Furthermore, the mounting ring 13 fixates the membrane 12. The mounting ring 13 may comprise sealing gates 16. The mounting ring 13 is partially fixed by riveting. Therefore single rivets 18 are applied.

Figure 2B:
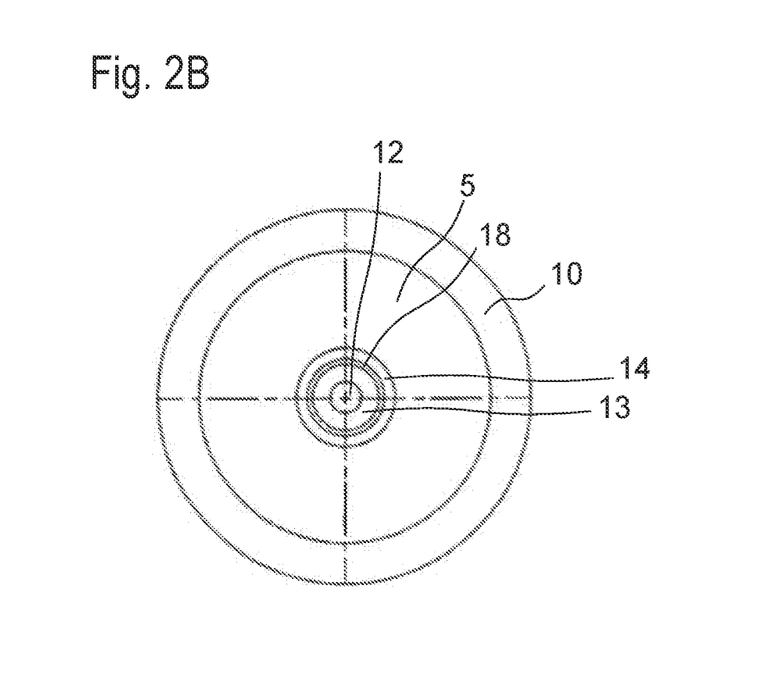
FIG. 2B shows a bottom view of the capacitor according to a second embodiment.

In a second embodiment, riveting is completed on the whole perimeter of the mounting ring 13 as shown in FIG. 2B. Fully riveting allows a stronger fixation of the mounting ring 13 and the membrane 12. Partial riveting saves material, and therefore costs.

In another embodiment, the mounting ring may be fixed by another process such as cutting-in, forging or any kind of welding, preferably laser welding.

Figure 3:
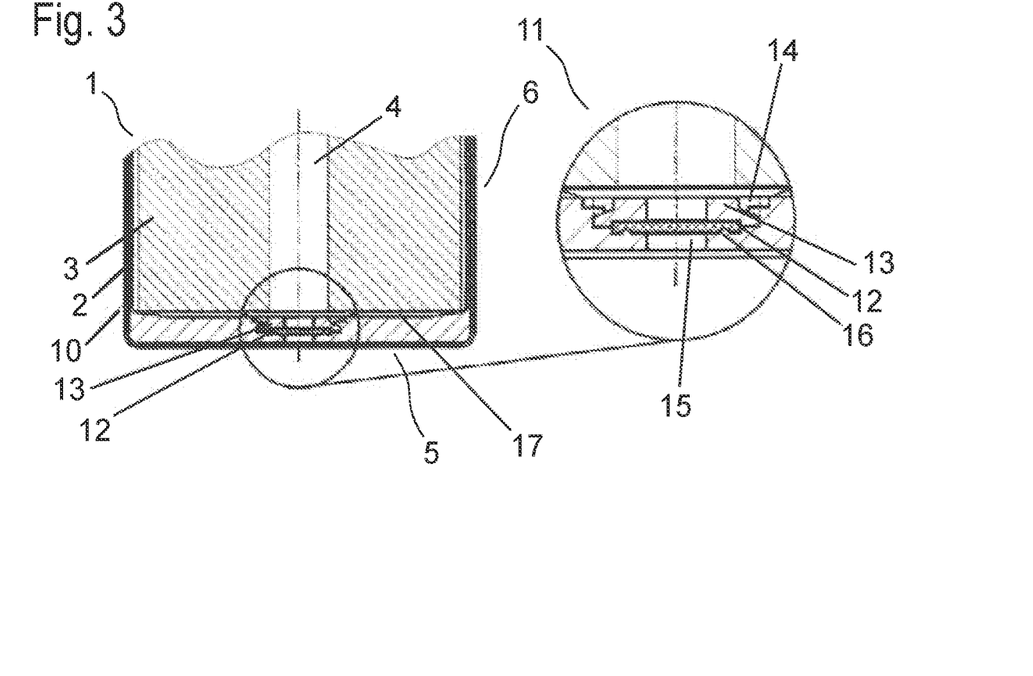
FIG. 3 shows a schematic cross-sectional view of a part of the capacitor according to a third embodiment and a detailed view of its controlling element.

FIG. 3 shows a partial cross-sectional view of a part of the capacitor 1 comprising the bottom 5 of the case 2 and a part of its lateral side 6. In the shown third embodiment the recess 14 for embedding the membrane 12 and the mounting ring 13 is inside the case 2. The recess 14 is positioned axial-centred. Therefore, the gas from the axial-centred cavity 4 in the centre of the capacitor element 3 can flow directly to the membrane 12. For protection a shrinking sleeve 10 surrounds the capacitor 1 at its lateral side 6.

The controlling element 11 is enlarged in a detail view for better recognition. The controlling element 11 is arranged axial-centred in the bottom 5 of the case 2. The recess 14 is recessed in the inner side of the case 2. The recess 14 narrows to a hole 15 connecting the inside and the outside of the case 2. In the recess 14 the membrane 12 is arranged.

When the membrane 12 is arranged in the recess 14, the mounting ring 13 is embedded into the recess 14 onto the membrane 12. The mounting ring 13 is suitably formed to accommodate the membrane 12. During the assembly process, pressure is applied to the mounting ring 13, which is transported to the membrane 12. As a result, the membrane 12 is deformed to make the system tight. By using a larger mounting ring 13 the membrane 12 may be tightened more strongly.

Sealing gates 16 on the inner surface of the recess 14 support the deforming and sealing process. After the membrane 12 and the mounting ring 13 are arranged in the recess 14, the mounting ring 13 is fixed by an external process like cutting-in, forging or any kind of welding. By fixing the mounting ring the membrane is fixed as well.

In another embodiment, the surface of the mounting ring 13 comprises sealing gates 16. The sealing gates 16 may be created as bumps.

Figure 4:
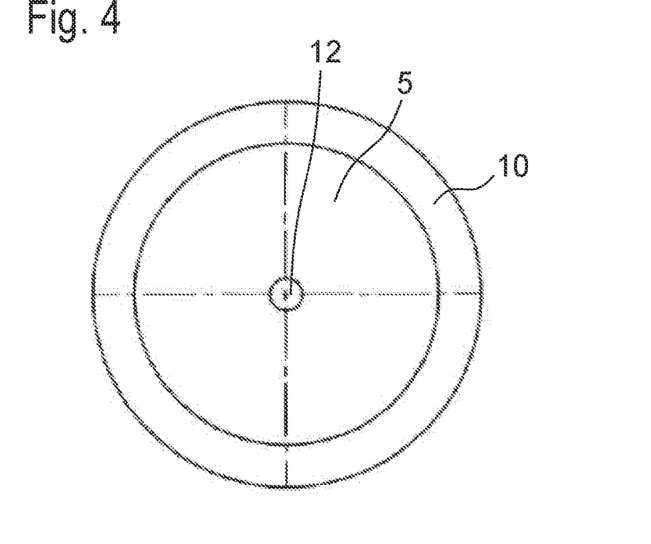
FIG. 4 shows a bottom view of the capacitor according to the third embodiment.

FIG. 4 shows a bottom view of the third embodiment of the capacitor 1. From the outside only the membrane 12 is visible through the hole 15 in the bottom 5. The membrane 12 covers the mounting ring 13 and the recess 14 inside the case 2 according to FIG. 3. The hole 15 is axial-centred. For protection a shrinking sleeve 10 surrounds the capacitor 1.

Possible embodiments of the present invention are not limited to the embodiments shown in the FIGS. 1 to 4. Different types of capacitors comprising different types of capacitor elements can be constructed with the disclosed controlling element and are also disclosed herein. Besides the disclosed terminals configured in a snap-in style for electrically contacting the capacitor, other types of terminals are realized in other embodiments of the present invention. For example, the terminals may be configured as screw-type terminals.

List of Reference Signs
1 electrolytic capacitor
2 case
3 capacitor element
4 axial-centred cavity in the capacitor element
5 bottom
6 lateral side
7 upper side
8 terminal
8A terminal tab
8B terminal rivet
9A cover member (paper laminate)
9B cover member (elastomer)
10 shrinking sleeve
11 controlling element
12 membrane
13 mounting ring
14 recess in the case 2
15 hole in the case 2
16 sealing gate
17 inner distance between capacitor element 3 and controlling element 11
18 rivet

The invention claimed is:

1. An electrolytic capacitor, comprising:
a case having a recess, the recess being located on an inside surface of the case or an outside surface of the case;
a capacitor element mounted in the case;
a mounting ring; and
a controlling element for controlling gas diffusion between inside and outside the case, the controlling element including a membrane embedded within the recess, the mounting ring for fixing the membrane within the recess.

2. The electrolytic capacitor of claim 1, wherein the controlling element provides a passageway for gas from the inside to the outside of the case, and is further configured to control movement of gas to provide diffusion.

3. The electrolytic capacitor of claim 1, wherein the capacitor element comprises a cavity, wherein the controlling element is arranged such that gas from the cavity can flow directly to the controlling element.

4. The electrolytic capacitor of claim 3, wherein the controlling element is arranged directly adjacent to the cavity.

5. The electrolytic capacitor of claim 1, wherein the case comprises a can and a cover member for sealing the can, wherein the controlling element is arranged in the can.

6. The electrolytic capacitor of claim 1, wherein the case includes electrical terminals, the controlling element is embedded in a part of the case opposite to the location of the electrical terminals.

7. The electrolytic capacitor of claim 1, wherein the controlling element is fully integrated in the case.

8. The electrolytic capacitor of claim 1, wherein the controlling element and the capacitor element are separated by a distance to provide a space to permit gas flow.

9. The electrolytic capacitor of claim 1, wherein the membrane acts as an irreversible safety vent in the event of exceeding a maximum permissible pressure within the capacitor.

10. The electrolytic capacitor of claim 9, wherein the maximum permissible pressure is determined by the tightness of the membrane.

11. The electrolytic capacitor of claim 1, wherein the membrane consists of a material which is one of silicon, EPDM, or another elastic polymer.

12. The electrolytic capacitor of claim 1, wherein the membrane has a disk shape.

13. The electrolytic capacitor of claim 1, wherein a surface of the mounting ring comprises a sealing gate for increasing the tightness of the membrane.

14. The electrolytic capacitor of claim 1, wherein an inner surface of the recess comprises a sealing gate for increasing the tightness of the membrane.

15. The electrolytic capacitor of claim 1, wherein the mounting ring is riveted, forged, or welded to the case.

16. The electrolytic capacitor of claim 15, wherein, when the recess is located on the inside surface of the case, the mounting ring does not protrude beyond the inside surface, and wherein, when the recess is located on the outside surface of the case, the mounting ring does not protrude beyond the outside surface of the case.

17. A method of fixing a membrane on a capacitor element, comprising:
providing an electrolytic capacitor comprising a case having a recess for receiving the membrane, the capacitor element being mounted in the case;
embedding a membrane in the recess;
positioning a mounting ring consisting of metal onto the membrane;
deforming and tightening the membrane by contact with the mounting ring; and
fixing the mounting ring.

18. An electrolytic capacitor, comprising:
a case having a recess;
a capacitor element mounted in the case;
a membrane for controlling gas diffusion between inside and outside the case, the membrane having a tightness that determines a maximum gas pressure within the case; and
a mounting ring for holding the membrane in the recess; and
sealing gates located on at least a surface of the recess or on a surface of the mounting ring for controlling the tightness of the membrane.

19. The electrolytic capacitor of claim 18, wherein the sealing gates include structural bumps on the surface of the recess or the mounting ring.

20. The method of claim 17, wherein the fixing the mounting ring includes riveting, forging, or welding the mounting ring to the case.

* * * * *